US008839107B2

(12) United States Patent
Corville et al.

(10) Patent No.: US 8,839,107 B2
(45) Date of Patent: Sep. 16, 2014

(54) CONTEXT BASED SCRIPT GENERATION

(75) Inventors: Allen O. Corville, Morrisville, NC (US); Jian De Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/119,908

(22) Filed: May 13, 2008

(65) Prior Publication Data

US 2009/0287643 A1    Nov. 19, 2009

(51) Int. Cl.
*G06F 3/048* (2013.01)
*G06F 17/30* (2006.01)
*G06F 3/038* (2013.01)
*G06F 9/44* (2006.01)
*G06F 3/023* (2006.01)

(52) U.S. Cl.
CPC  *G06F 3/038* (2013.01); *G06F 8/20* (2013.01); *G06F 3/023* (2013.01)
USPC ............................ 715/704; 717/115; 717/116

(58) Field of Classification Search
CPC ...... G06F 11/3414; G06F 3/048; G06F 17/30
USPC ................................... 715/704; 717/115, 116
See application file for complete search history.

(56) References Cited

U.S. PATENT DOCUMENTS

| 5,901,319 | A  | * | 5/1999  | Hirst            | 717/164 |
|-----------|----|---|---------|------------------|---------|
| 6,046,741 | A  | * | 4/2000  | Hochmuth         | 715/704 |
| 6,167,567 | A  | * | 12/2000 | Chiles et al.    | 717/173 |
| 6,184,880 | B1 | * | 2/2001  | Okada            | 715/704 |
| 6,690,392 | B1 | * | 2/2004  | Wugoski          | 715/744 |
| 7,039,899 | B1 |   | 5/2006  | Quiroga          |         |
| 7,461,342 | B2 | * | 12/2008 | McLean           | 715/704 |
| 7,627,821 | B2 | * | 12/2009 | Klementiev       | 715/704 |
| 7,653,896 | B2 | * | 1/2010  | Herdeg, III      | 717/113 |
| 7,694,223 | B2 | * | 4/2010  | Corson           | 715/704 |
| 2003/0023952 | A1 | * | 1/2003 | Harmon, Jr.     | 717/106 |
| 2004/0237069 | A1 |   | 11/2004 | Colgrave        |         |
| 2005/0010926 | A1 |   | 1/2005  | Narayanaswamy et al. | |
| 2005/0144595 | A1 | * | 6/2005 | McLean          | 717/136 |

(Continued)

OTHER PUBLICATIONS

Pogue, Mac OS X: The Missing Manual, Tiger Edition, O'Reilly Media, Jul. 2005, Figure 8-3 (see attached pdf).*

(Continued)

*Primary Examiner* — Boris Pesin
*Assistant Examiner* — Matthew Ell
(74) *Attorney, Agent, or Firm* — Prentiss Johnson: SVL IP Law Edell, Shapiro & Finnan, LLC

(57) ABSTRACT

A method for generating script in a computer system having a user interface includes performing user actions by a user using the user interface to perform a user task, monitoring the user actions by the computer system, determining environment information in accordance with the user actions to provide determined environment information, and generating script in accordance with the user actions and the determined environment information to provide generated script. Storing the generated script and repeating the user actions in accordance with the stored script are provided. The user task includes configuring an application program and configuring a further application program in accordance with the generated script. The environment information includes configuration information and an identification of an operating system. The user actions further include providing user input data, updating a data object, and creating a system resource. The script is generated in accordance with context information.

32 Claims, 6 Drawing Sheets

(56) References Cited

U.S. PATENT DOCUMENTS

2005/0257196 A1 11/2005 Hollander et al.
2007/0162891 A1 7/2007 Burner et al.
2009/0172533 A1* 7/2009 Hamzaoui et al. ............ 715/704

OTHER PUBLICATIONS http://www-1.ibm.com/support/docview.wss?uid=swg27006473 <retrieved on Nov 19, 2007>.

* cited by examiner

CONTEXT BASED SCRIPT GENERATION

BACKGROUND

This invention relates generally to the field of performing tasks on a computer system and, in particular, to repeating tasks performed on a computer system.

It is often desirable to generate script according to user actions. For example, U.S. Patent Application Pub. No. US2004/0237069 A1 filed by Colgrave on Nov. 5, 2003 teaches creation of script for executing commands. The Colgrave method receives a sequence of commands for execution and an indication of a scripting language. In response to the received information the system assembles a set of commands into the scripting language and outputs the script to the user.

Additionally, U.S. Patent Application Pub. No. US2005/0257196 A1 filed by Hollander et al. on May 17, 2004 teaches execution of script generated by an application program. The Hollander method generates the script in order to facilitate the development of new services from legacy computer applications. During execution of a legacy application the Hollander system intercepts messages between the application and the operating system at a messaging layer. The Hollander system also captures a plurality of controls and data, and generates script for the application accordingly. The generated script can later be executed at a later time.

Additionally, U.S. Pat. No. 7,039,899 issued to Quiroga on May 2, 2006 teaches a method for automatically generating script for testing application software. The script generator taught by Quiroga generates script from metadata that includes code which defines the application software. An execution engine uses the generated script and a corresponding set of data to simulate a use of the application software by an end user.

U.S. Patent Application Pub. No. US2007/0162891 A1 filed by Burner et al. on Jan. 12, 2006 teaches a graphical aid for generating object set up scripts. In the Burner et al. method a graphical user interface form is presented to a user. The user provides input into the fields within the form. A set of object set up scripts are then generated based on the user input. For example, the Burner et al. system may provide script for setting up WebSphere® MQ objects.

U.S. Patent Application Pub. No. US2005/0010926 A1 filed on Feb. 20, 2004 by Narayanaswamy et al. teaches a method for assembling and deploying program units to application servers. The assembling and deployment uses cluster deployment flow architecture to automatically deploy to a cluster of application servers. The assembling and retrieving of information may be performed interactively using a user interface that retrieves information related to a program unit.

BRIEF SUMMARY

A method for generating script in a computer system having a user interface includes performing user actions by a user using the user interface to perform a user task, monitoring the user actions by the computer system, determining environment information in accordance with the user actions to provide determined environment information, and generating script in accordance with the user actions and the determined environment information to provide generated script.

Storing the generated script and repeating the user actions in accordance with the stored script are provided. The user task includes configuring an application program and configuring a further application program in accordance with the generated script. The environment information includes configuration information, an identification of an operating system, and information on whether the system is a single node system. The user actions further include providing user input data, updating a data object, and creating a system resource.

The script is generated in accordance with context information. The context information includes scope information. A data repository containing stored script is provided and the generated script is queried against the stored script.

BRIEF DESCRIPTION OF THE SEVERAL VIEWS OF THE DRAWINGS

Embodiments of the invention will be described in conjunction with the following drawings in which like numbers designate like elements and wherein.

DETAILED DESCRIPTION

Figure 1:
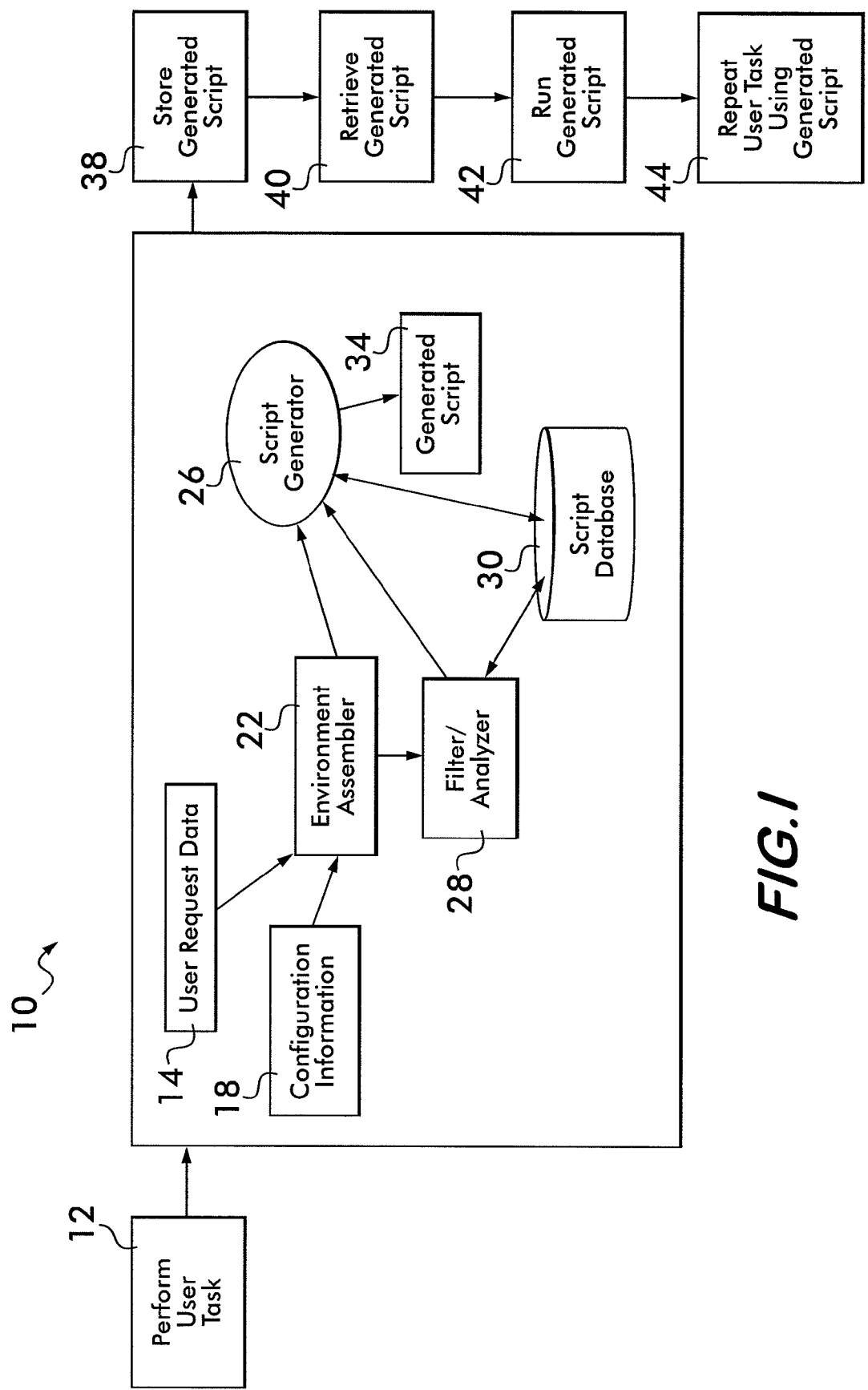
FIG. 1 shows a block diagram representation of an embodiment of the context based script generation system of the invention.

Referring now to FIG. 1, there is shown an embodiment of the context based script generation system 10. A user of the context based script generation system 10 can enable the context based script generation system 10 to operate in the background while the user uses a user friendly interface as shown in block 12 to perform actions which the user could alternately perform using command line instructions. While the user performs the actions from the user friendly user interface, and the context based script generation system 10 runs in the background, the context based script generation system 10 can monitor the user interface, and thereby the user input and other information pertaining to the user actions.

The context based script generation system 10 can include an environment assembler 22. The environment assembler 22 can gather information regarding the operating environment of the system on which the context based script generation system 10 is running while the user performs the monitored tasks. This information can include configuration information 18 such as the type and version of the operating system, the names and values of system environment variables, the networked or non-networked status of the machine, the presence of other active applications, and any other system information.

When a user submits information through the user friendly user interface, it can be received by the context based script generation system 10 in the form of the user request data 14. In one preferred embodiment, the user can submit the user request data 14 via HTTP through a web form, as shown in more detail below. Furthermore the user can use any other methods of submission in a similar manner. The context based script generation system 10 passes the user request data 14 to the script generator 26, which can generate the script 34. The generated script 34 can contain the textual commands to perform the monitored tasks represented by the user request data 14 including the values that the user entered into the user friendly user interface. Accordingly, the context based script generation system 10 can store the generated script 34 as shown in block 38. A user can later retrieve the generated script 34 as shown in block 40 and run the generated script 34 as shown in block 42. As shown in block 44, the generated script 34 which is run in this manner can repeat the monitored task performed by the user according to block 12.

The environment assembler 22 of the context based script generation system 10 can pass the environment information to the script generator 26 simultaneously with the receiving of the user request data 14. The script generator 26 can cause the generated script 34 and the environment information to be stored in a relational manner in the script database 30. The database 30 can be any type of data repository. For example, the script database 30 can be a file system, a text document or a file object. The context based script generation system 10 can retrieve script stored in the script database at a later time. Furthermore, a user can run the script retrieved from the script database 30 at a later time in order to repeat the actions performed by the user during the monitored session.

As the context based script generation system 10 monitors the user actions and the environment assembler 22 receives the request data 14 and configuration information 18, the environment assembler 22 can also pass the combined information to the filter/analyzer 28. The filter/analyzer 28 can analyze the combination of the user request data 14 and the output of the environment assembler 22 to create a query. The query can be any type of query appropriate for the type of data repository used. The query created by the filter/analyzer 28 is run against the script database 30 to determine whether the task being performed by the user can be performed by any script already stored in the script database 30. In addition, the filter/analyzer 28 can determine the most efficient script to perform the set of tasks that the user has performed.

In one embodiment of the invention the context based script generation system 10 can inform the user by a visual alert or other method when one or more scripts is available in the script database 30 that, based upon the query result, may represent the task or tasks the user is performing. Furthermore, the script generation system 10 can present a list of the stored scripts to the user for review. The user may select one of the stored scripts from the list. In one preferred embodiment of the invention the script generation system 10, rather than the user, can perform the selection of the script. When the script generation system 10 selects the script it can use any optimization algorithms desired. If the user selects one of the stored scripts, the context based script generation system 10 can retrieve the script from the script database 30 and execute the script, thereby completing the task that the user is performing.

Thus, the script generation system 10 can permit a user to repeat tasks without repeating the actions required for performing the tasks from the user friendly interface. The user can repeat the tasks without manually generating the scripts that would be required to perform the tasks from the command line. For example, a user may be required to configure multiple application servers on the same or multiple systems. The user can enable the script generation system 10 to operate in the background while performing the first configuration in order to permit the script generation system 10 to monitor the configuration session and generate a script accordingly. The user can then use the script 34 generated by the script generation system 10 during the first configuration to perform the remaining configurations at a later time.

Therefore, according to the script generation system 10, in order to perform the remaining configurations, the user is not required to repeat the actions performed during the configuration of the first application. Furthermore, the user can avoid the repetition of the monitored actions without having the expertise required to manually generate and debug the required script.

In order to generate the script 34 that can repeat the actions performed while using the user friendly interface, the script generation system 10 can determine the context of the monitored actions. The input received by the script generation system 10 can include the identity of any application or interface running during the monitored session. The input can also include the status of the application or interface at each point during the session, any languages used for writing the applications or building the interfaces, any operations the user performs using the applications or interfaces, any values entered by the user, the data types of any values entered by the user, any modifications of values performed by the user, any object created by the user, and any other object types modified by the user. The user input data can also include resource properties, for example the names, descriptions and attributes of resources, as well as any changes to the names, descriptions or attributes of the resources or other information.

The types of tasks monitored by the script generation system 10 to perform script generation can include administrative tasks, maintenance tasks or any other types of task that can be performed using a computer interface. The functions performed during the user interface tasks can include functions such as installing applications or interfaces, configuring applications or interfaces, creating resources used by applications or interfaces, or any other types of user interface functions. Additionally, the operations performed can include creating, retrieving, updating or deleting items such as data, objects or any other types of resources or underlying application constructs. Accordingly, the script generation system 10 can generate scripts based on these functions and operations, or upon any other functions and operations used to perform the monitored tasks during a monitored session.

The configuration information 18 received by the environment assembler 22 can also include information regarding the server or the application space in which the user is performing the tasks during a monitored session. The configuration information 18 can include the identity of the application, the application topology or any other context information that identifies a location within the application space where the user is making the changes.

Additionally, the environmental assembler 22 can determine information regarding the environment in which the user is operating by analyzing the application space where the user performs the tasks. For example, the environmental assembler 22 may determine that the user is operating in a non-persistent data environment. Alternately, the user environment may be one in which the user is creating, retrieving, updating or deleting persistent data within a database. The user environment may also be a clustered environment wherein a change made by the user can require changes in other locations within an application. Additionally, the user environment can be a single server environment or a node environment having multiple servers.

The environmental assembler 22 can gather any other environmental information with respect to any application programs, operating systems, servers or other machines the user may use to change objects. The script generation system 10 can use the environment information received while monitoring a user session to ensure that the generated script 34 targets the appropriate environment when it is run for the purpose of repeating the monitored actions. This permits the script 34 generated by the script generation system 10 to be environment specific. Additionally, it permits the script generation system 10 to target multiple environments when necessary.

As previously described, the environmental assembler 22 can pass the information received according to blocks 14, 18 to the filter/analyzer 28. The filter/analyzer 28 can construct context and input values representative of the monitored session based upon the information received and forwarded by the environmental assembler 22. The filter/analyzer 28 can also construct a query according to the information received from the environmental assembler 22 and apply the query to the script database 30 so that the script database 30 can provide the script for output. Additionally, the filter/analyzer 28 can inform the script generator 26 which script and values it should retrieve or generate. The script generator 26 can then query the script database 30 for the format, parameters and syntax of the script. The script generator 26 can then construct the script 34 for any set up commands required to repeat the monitored operations as shown in block 44.

Figure 2:
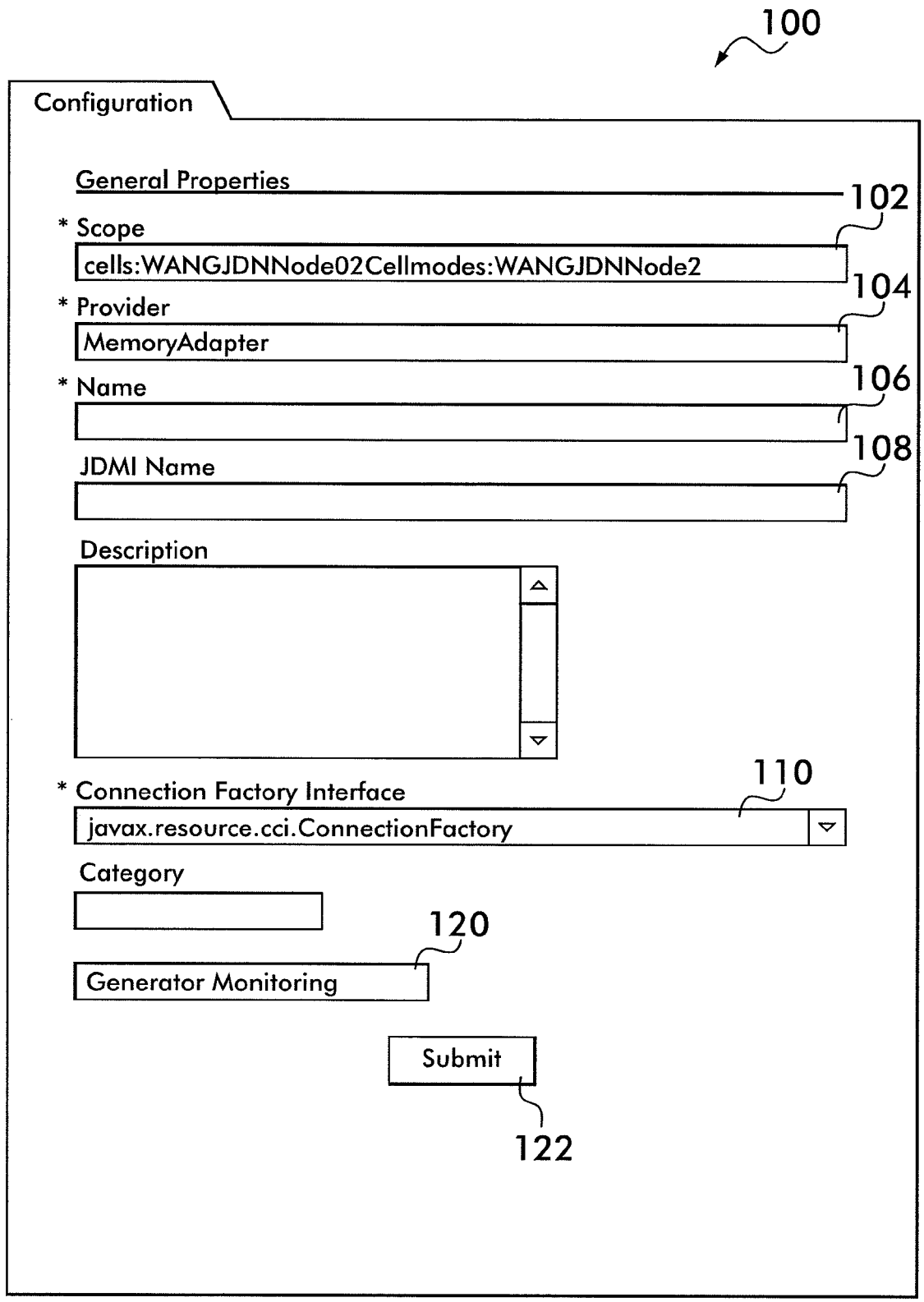
FIG. 2 shows a screenshot of a graphical user interface that can be provided by an application for performing tasks while the context based script generation system of FIG. 1 is enabled.

Referring now to FIG. 2, there is shown a screenshot of a graphical user interface (GUI) 100. An application for performing a user desired task can present a GUI such as the GUI 100 to a user in order to assist the user in performing the task. Thus, the script generation system 10 can receive the user inputs and the configuration information previously described with respect to blocks 14, 18 and generate the script 34 required for repeating the user actions while the user uses the GUI 100. The GUI 100 can include an enable box 120 for the user to check in order to enable the script generation system 10 to operate in the background while the user performs the task that provides the GUI 100.

For example, an application program can provide the GUI 100 in order to assist a user in configuring the application program, in a manner well understood by those skilled in the art. The user can activate the script generator system 10 to monitor the configuration process while using the GUI 100 by checking the enable box 120. The script generation system 10 can thus generate a script 34 to permit the user to subsequently configure other application programs in the same manner. Furthermore, it will be understood that the context based script generator system 10 can monitor operations performed on any GUI provided for use with any type of application program for generation of script to repeat user operations in this manner.

Within the GUI 100, the user can make an entry into the scope box 102 to indicate a portion of an application program the user wants to configure during a configuration session using the GUI 100. The user can use the provider box 104 within the GUI 100 to indicate a class or other structure to provide a resource to the application program the user is configuring. The name box 106 of the GUI 100 can indicate a referenceable name of a resource the application program can create as a result of the submission of the information entered into the GUI 100 to the application.

For example, the application that the user is configuring using the GUI 100 while the script generation system 10 monitors the user actions can include a routine for assisting in creating a connection factory as shown in the table below.

TABLE

ConnectionFactory
proc CreateCF {nodeName raName cfName jndiName cfiIndex} {
   global AdminConfig
   global AdminControl
   set cell [$AdminControl getCell]
   set ra [$AdminConfig getid TABLE-continued /Cell:$cell/Node:$nodeName/J2CResourceAdapter:$raName/]
   set cfi [lindex [$AdminConfig list ConnectionDefinition $ra] $cfiIndex]
   puts "ConnectionFactory__new: create a J2CConnectionFactory "
   set name__attr [list name $cfName]
   set jndi__attr [list jndiName $jndiName]
   set conndef__attr [list connectionDefinition $cfi]
   set attrs [list $name__attr $jndi__attr $conndef__attr]
   $AdminConfig create J2CConnectionFactory $ra $attrs
   puts "ConnectionFactory__new: saving the configuration"
   $AdminConfig save
}

The connection factory script shown in the table is useful for providing connections between user variables and resources within the application program that the user is configuring. The GUI 100 can define the format of the information entered by the user and assign input values provided by the user to the parameters of the connection factory. For example, in the line of script in the table "proc CreateCF {nodeName raName cfname jndiName cfiIndex}," the user can assign values to be passed as input parameters used within the connection factory procedure shown in the table. Thus, for example, the user can insert a user supplied name to be assigned to the connection factory into box 106 as the value of the input parameter cfName.

Additionally, the user can insert a name of a Java interface jndiName into the JNDI name box 108 to name a Java interface for linking resources. In another preferred embodiment, the user can leave the name box 108 blank in order to permit the application to use a default interface name. The user can use the connection factory interface box 110 to indicate the name of the connection factory implementation class of which an instance will specify configuration parameters of the connection factory resource. In the preferred embodiment, connection factory interface box 110 can be a drop-down menu. When the user selects the connection factory interface using the box 110 a corresponding index value is assigned to the input parameter cfiIndex.

When the user finishes filling out the information requested by the GUI 100, the user can submit the input information by clicking the submit button 122 provided by the GUI 100. The script generation system 10 can also receive the configuration information when the user clicks the submit button 122 or through any type of synchronous automatic submission procedure.

If the configuration of the application program performing the monitored tasks requires further input through a second GUI page it can present another page after the user clicks the submit button 122 for the first page. The process of receiving the user request data and the configuration information as shown in blocks 14, 18, can continue in this manner for as many GUI pages as required until the user takes all of the steps required for performing the desired task. Each time the user fills out and submits a page in this manner during the task, the environmental assembler 22 can receive the user inputs and configuration information and apply them to the filter/analyzer 28 as previously described.

In one embodiment of the invention the user can have the option of enabling or disabling the operations of the script generation system 10 on each page using a box such as the enable box 120. This can permit the generation of script 34 by the script generation system 10 only up to or only from a selected point in the monitored task. Thus, the task performed by the user can be broken into as many segments as desired. A user can execute segment specific script 34 generated in this manner at a later time in connection with other segments of script generated in this manner, with user actions using a user friendly interface or a command line, or any other source of instructions.

Figure 3:
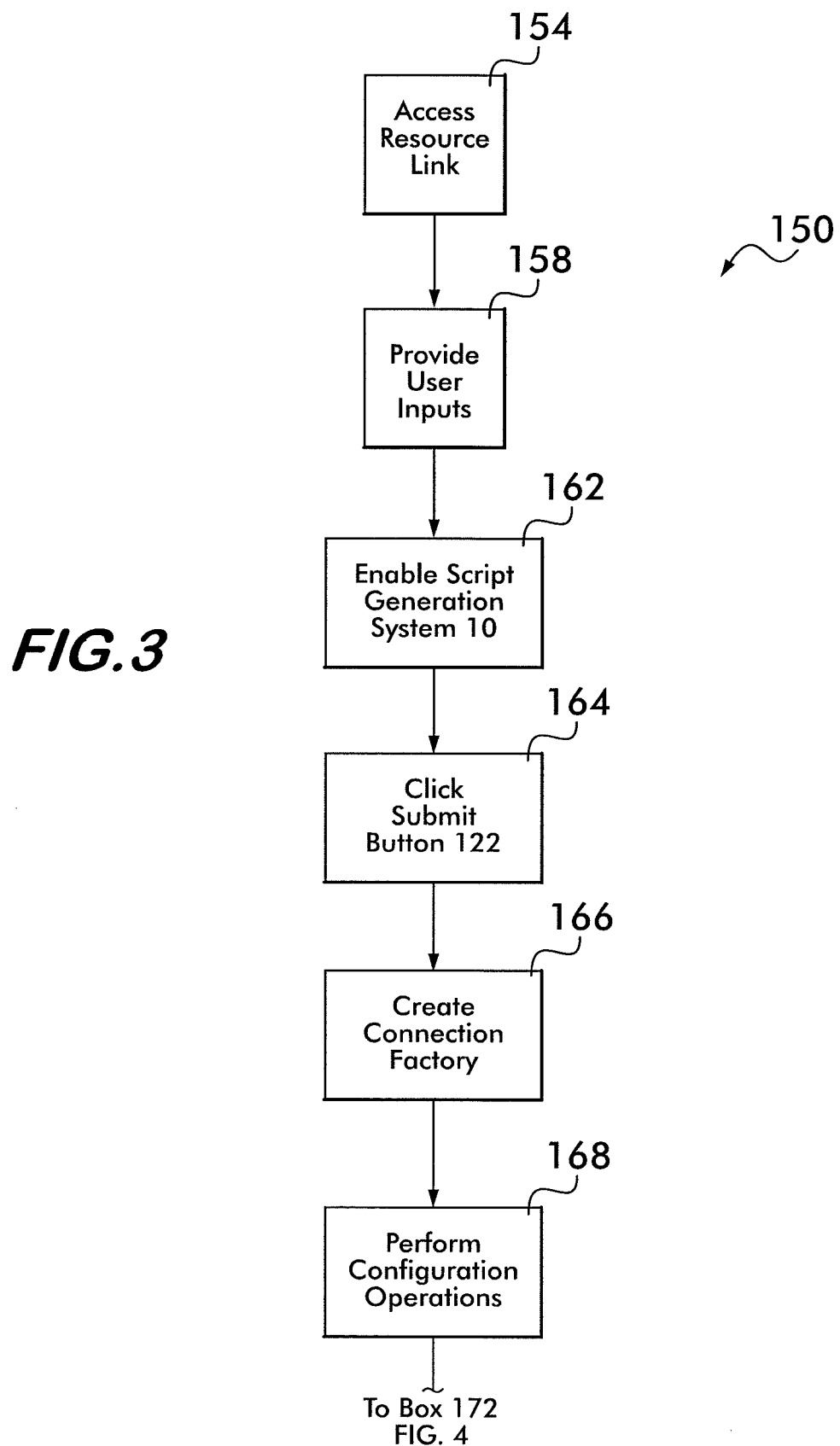
FIGS. 3, 4 show block diagram representations of an embodiment of a process for permitting a user to take actions required to perform a task and to permit the script generation system of FIG. 1 to monitor the user actions.
Figure 4:
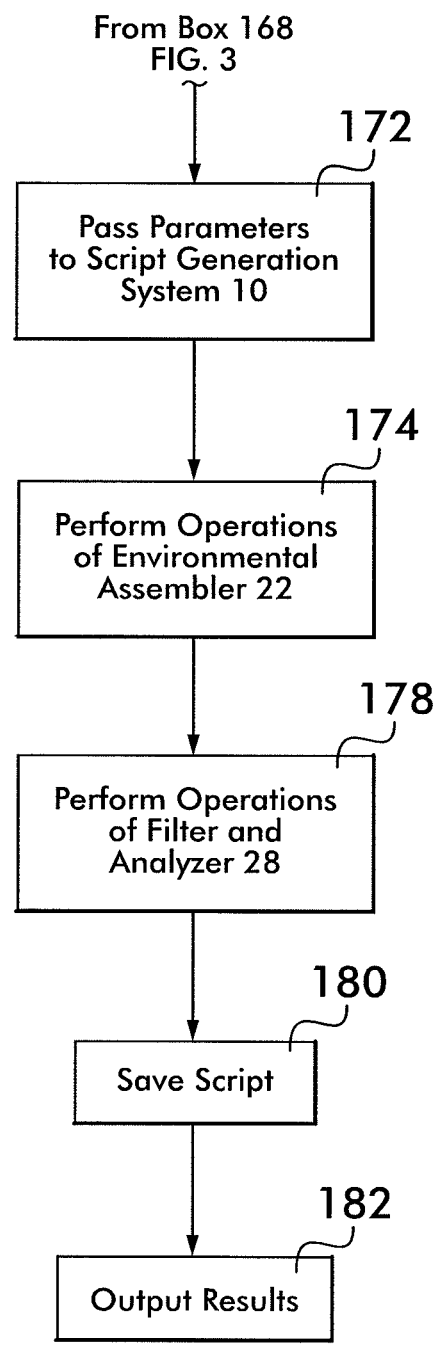

Referring now to FIGS. 3, 4, there is shown a block diagram representation of a process flow 150. The process flow 150 indicates steps a user and the script generation system 10 can perform in order to permit the user to perform a task and to permit the script generation system 10 to monitor the user actions and generate a script 34 or scripts 34 for repeating the task. For example, the user can use the process flow 150 to configure an application program using a GUI such as the GUI 100 and generate a script 34 for configuring an additional application program as previously described.

As shown in block 154 of the process flow 150, a user can access a hyperlink in order to obtain resources required for the monitored process. As shown in block 158, the user can provide input parameters for the script generation system 10 by, for example, performing a configuration of an application program using the GUI 100. The user of the script generation system 10 can enable the script generation system 10 as shown in block 162 by clicking the enable box 120 of the GUI 100. In an alternate embodiment, the user can click the enable box 120 at any time while the application program displays the GUI 100. As shown in block 164 the user can click the submit button 122 when the GUI 100 input is completed.

When the user clicks the submit button 122 as shown in block 164, a connection factory such as the one set forth in the above table can be created using the user input information as shown in block 166. In a preferred embodiment of the invention the configuration of an application program or other task performed by the user can include a servlet for processing the input of the GUI 100. For example, a servlet provided by the application program can gather the input from the user, determine the scope indicated by the user and create the connection factory.

As shown in block 168, the monitored task can perform operations indicated by the user by way of the GUI 100. For example, if the user is monitoring a process for creating a resource using the script generation system 10, the creation of the resource can be implemented in block 168. In a preferred embodiment of the invention the application performs the monitored operations in substantially the same manner as they would be performed if the script generation system 10 is not enabled. The script generation system 10 can receive the inputs entered by the user during the configuration process as shown in block 172. The script generation system 10 can also perform the operations of the environment assembler 22 as shown block 174. Additionally, the script generation system 10 can perform the operations of the filter/analyzer 28 as shown in block 178.

The script generation system 10 can perform some of the operations shown in blocks 172, 174, 178 simultaneously or in any convenient order. Furthermore, the operations of blocks 172, 174, 178 can be performed before, simultaneously with, or after the operations of block 168. The script 34 generated by the script generation system 10 can be saved as shown in block 180 and the results can be output to the user as shown in block 182.

Figure 5:
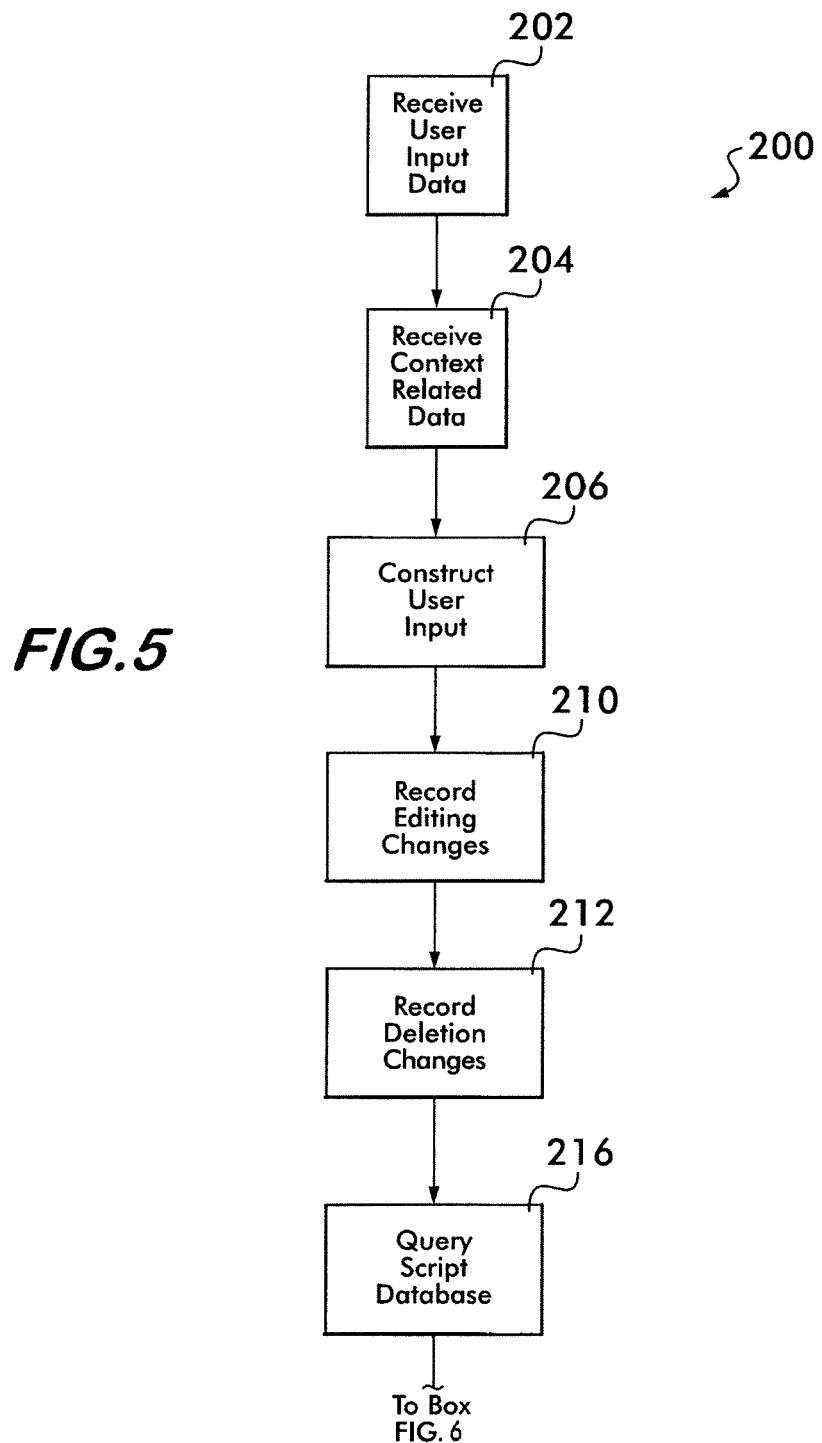
FIGS. 5, 6 show block diagram representations of an embodiment of a process for permitting a user to take actions required to perform a task and to permit the script generation system of FIG. 1 to monitor the user actions.
Figure 6:
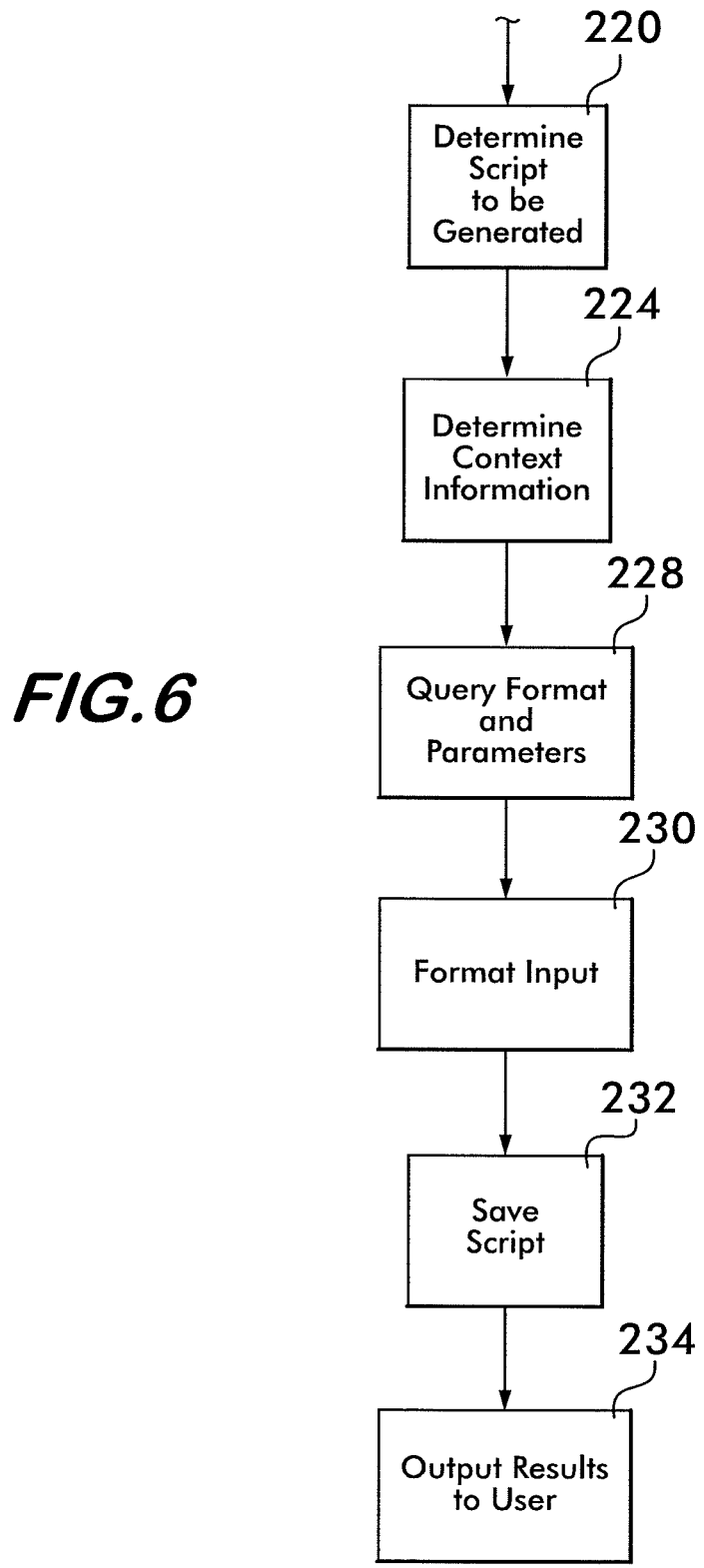

Referring now to FIGS. 5, 6, there is shown the process flow 200. The process flow 200 indicates steps a user and the script generation system 10 can perform to permit the user to perform a task and to permit the script generation system 10 to monitor the user actions and generate the script 34 for repeating the user actions. Within the process flow 200, the environment assembler 22 can receive user input data as shown in block 202, for example by way of the GUI 100.

Additionally, the script generation system 10 can obtain context related data as shown in block 204. The context related data can include scope (such as a cell/node/server), resource type (such as a connection factory) or operations (such as create/edit/delete).

The filter/analyzer 28 can then analyze the operations performed by the user. It can construct the whole user input as shown in block 206. If the user performs editing operations during the session, the filter/analyzer 28 can analyze and record the editing changes as shown in block 210. For example, in block 210 the filter/analyzer 28 can determine any changes between the user input and previous configuration information and record the changes. Additionally, the filter/analyzer 28 can analyze and record any changes to the properties of resource types as shown in block 210. For example, if the user performs a delete operation the filter/analyzer 28 can determine the configuration identification of the resource type of the item deleted, as shown in block 212.

The script generator 26 can then process the input received from the filter/analyzer 28. Accordingly, the script generator 26 can query the script database 30 as shown in block 216 and determine the script 34 which must be generated as shown in block 220. Context information, such as scope, can also be determined as shown in block 224. The script generator 26 can query the format and the required parameters against the database 30 as shown in block 228 and format the input. In order to generate the script 34 the script generator 26 can format the input as shown in block 230 and generate the script based on the context. The script generation system 10 can save the generated script 34 as shown in block 232 and outputs the results as shown in block 234.

While embodiments of the invention have been described in detail and with reference to specific examples thereof, it will be apparent to one skilled in the art that various changes and modifications can be made therein without departing from the spirit and scope thereof.

The invention claimed is:

1. A method for generating scripts in a computer system, comprising:
    providing a user interface for enabling a user to perform user actions using said user interface to perform a user task;
    monitoring said user actions by said computer system;
    determining system operating environment information in accordance with said user actions;
    generating a script in accordance with said user actions and said determined system operating environment information for repeating said user task using said script generated in accordance with said determined system operating environment information, wherein said generating a script includes:
        creating a query using a combination of data representing said user actions and said determined system operating environment information and determining a plurality of previously generated scripts associated with the monitored user actions based on said query, wherein previously generated scripts are stored in a data repository;
        analyzing said monitored user actions;
        selecting a most efficient script from the plurality of previously generated scripts; and
        updating the selected, most efficient script responsive to the monitored user actions.

2. The method of claim 1, wherein said user task comprises configuring a first application program.

3. The method of claim 2, further comprising configuring a second application program in accordance with said generated script.

4. The method of claim 1, wherein said system operating environment information comprises configuration information.

5. The method of claim 1, wherein said system operating environment information comprises an identification of an operating system.

6. The method of claim 1, wherein said system operating environment information comprises information on whether said computer system is a single node system.

7. The method of claim 1, wherein said user actions comprise providing user input data.

8. The method of claim 1, wherein said user actions comprise updating a data object.

9. The method of claim 1, wherein said user actions comprise creating a system resource.

10. The method of claim 1, further comprising generating said script in accordance with context information.

11. The method of claim 10, wherein said context information further comprises scope information.

12. The method of claim 1, further comprising:
querying said previously generated scripts in the data repository.

13. The method of claim 12, further comprising querying said previously generated scripts by a filter/analyzer.

14. The method of claim 12, further comprising determining whether a previously generated script associated with said monitored user actions is stored in said data repository prior to generating a new script.

15. The method of claim 1, further comprising determining a script syntax for said script based on a selected previously generated script.

16. The method of claim 1, further comprising determining a script format for said script based on a selected previously generated script.

17. The method of claim 1, further comprising:
providing a graphical user interface; and
performing said user task by way of said graphical user interface.

18. The method of claim 17, further comprising monitoring said user actions by way of said graphical user interface.

19. The method of claim 1, further comprising performing said monitoring only in response to enabling said monitoring by said user.

20. The method of claim 1, further comprising determining said system operating environment information by an environment assembler.

21. The method of claim 20, further comprising determining a name of a system environment variable by said environment assembler.

22. The method of claim 20, further comprising determining an operating system by said environment assembler.

23. A system for generating scripts comprising:
a computer configured to:
provide a user interface for enabling a user to perform user actions using said user interface to perform a user task;
monitor said user actions;
determine system operating environment information in accordance with said user actions;
generate a script in accordance with said user actions and said determined system operating environment information for repeating said user task using said script generated in accordance with said determined system operating environment information, wherein said generating a script includes:
creating a query using a combination of data representing said user actions and said determined system operating environment information and determining a plurality of previously generated scripts associated with the monitored user actions based on said query, wherein previously generated scripts are stored in a data repository;
analyzing said monitored user actions;
selecting a most efficient script from the plurality of previously generated scripts; and
updating the selected, most efficient script responsive to the monitored user actions.

24. The system of claim 23, wherein said user task comprises configuring a first application program.

25. The system of claim 23, wherein the computer is further configured to:
determine at least one of a script syntax and script format for said script based on a selected previously generated script.

26. The system of claim 23, wherein the computer includes:
an environment assembler to determine said system operating environment information.

27. The system of claim 23, wherein the computer includes:
a filter/analyzer to query said previously generated scripts in the data repository.

28. A memory device comprising:
a non-transitory computer useable medium including program code that when executed by a computer is operable to:
provide a user interface for enabling a user to perform user actions using said user interface to perform a user task;
monitor said user actions;
determine system operating environment information in accordance with said user actions;
generate a script in accordance with said user actions and said determined system operating environment information for repeating said user task using said script generated in accordance with said determined system operating environment information, wherein said generating a script includes:
creating a query using a combination of data representing said user actions and said determined system operating environment information and determining a plurality of previously generated scripts associated with the monitored user actions based on said query, wherein previously generated scripts are stored in a data repository;
analyzing said monitored user actions;
selecting a most efficient script from the plurality of previously generated scripts; and
updating the selected, most efficient script responsive to the monitored user actions.

29. The memory device of claim 28, wherein said user task comprises configuring a first application program.

30. The memory device of claim 28, wherein the program code includes program code to:
determine at least one of a script syntax and script format for said script based on a selected previously generated script.

31. The memory device of claim 28, wherein the program code includes:
  an environment assembler to determine said system operating environment information.

32. The memory device of claim 28, wherein the program code includes:
  a filter/analyzer to query said previously generated scripts in the data repository.

* * * * *